United States Patent [19]

Stil et al.

[11] Patent Number: 4,957,657

[45] Date of Patent: Sep. 18, 1990

[54] PROCESS AND APPARATUS FOR COOLING AND PURIFYING A HOT GAS

[75] Inventors: Jacob H. Stil; Adrianus J. Ooms; Bernardus H. Mink, all of The Hague, Netherlands

[73] Assignee: Shell Oil Company, Houston, Tex.

[21] Appl. No.: 4,287

[22] Filed: Jan. 6, 1987

Related U.S. Application Data

[63] Continuation of Ser. No. 792,167, Oct. 25, 1985, which is a continuation of Ser. No. 677,894, Dec. 4, 1984, which is a continuation of Ser. No. 417,754, Sep. 13, 1982.

[30] Foreign Application Priority Data

Nov. 16, 1981 [NL] Netherlands .......................... 8105169

[51] Int. Cl.$^5$ ................................................ C01B 3/35
[52] U.S. Cl. .................................................... 252/373
[58] Field of Search ......................................... 252/373

[56] References Cited

U.S. PATENT DOCUMENTS 4,013,427  3/1977  Gernhardt ........................ 48/197 R

FOREIGN PATENT DOCUMENTS 1501284  2/1978  United Kingdom .

OTHER PUBLICATIONS

Perry et al, *Chemical Engineers' Handbook*, 5th ed., McGraw-Hill, New York (1973), pp. 20-81 to 20-82.

*Primary Examiner*—Bruce Gray

[57] ABSTRACT

The present process is directed to the cooling and cleaning of hot crude synthesis gas leaving a gas generator (solid hydrocarbon gasification reactor) wherein the hot crude synthesis gas leaving the top of the gas generator in an upflow direction is quenched by injection of cold purified synthesis gas. The gas velocity is then reduced and the gas stream is reversed in a downflow direction whereupon the gas velocity is increased again. The gas stream is again reversed in an upflow direction and the gas velocity is decreased whereafter the gas is indirectly cooled and flyash is separated therefrom.

17 Claims, 1 Drawing Sheet

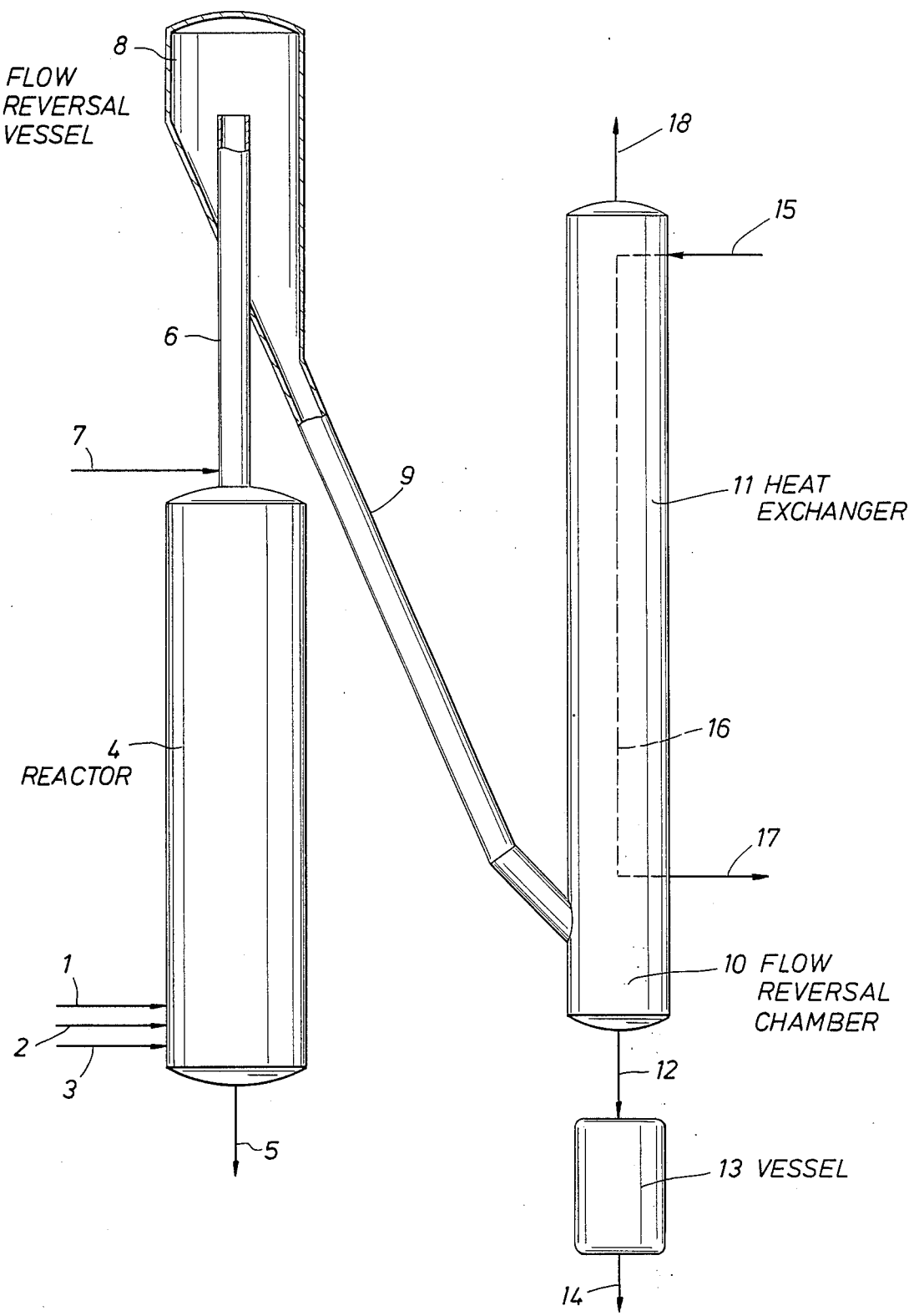

PROCESS AND APPARATUS FOR COOLING AND PURIFYING A HOT GAS

This is a continuation of application Ser. No. 792,167, filed Oct. 25, 1985, which is in turn a continuation of application Ser. No. 677,894, filed Dec. 4, 1984, which is in turn a continuation of Ser. No. 417,754, filed Sept. 13, 1982.

FIELD OF THE INVENTION

The present invention is directed to the cooling and cleaning of hot crude synthesis gas leaving a solid hydrocarbon gasification reactor.

BACKGROUND OF THE INVENTION

The present process is especially suitable for cooling and cleaning the hot crude synthesis gas leaving conventional hydrocarbon gasification reactors such as described in U.K. No. 1,150,284.

SUMMARY OF THE INVENTION

The present process is directed to the cooling and cleaning of hot crude synthesis gas leaving a gas generator (solid hydrocarbon gasification reactor) wherein the hot crude synthesis gas leaving the top of the gas generator in an upflow direction is quenched by injection of cold purified synthesis gas. The gas velocity is then reduced and the gas stream is reversed in a downflow direction whereupon the gas velocity is increased again. The gas stream is again reversed in an upflow direction and the gas velocity is decreased whereafter the gas is indirectly cooled and flyash is separated therefrom.

DESCRIPTION OF THE FIGURE

The FIGURE is a diagramatic representation of the apparatus in which the process according to the invention is carried out; however, auxillary equipment, such as pumps, compressors, valves, cleaning devices and control instruments are not shown.

DESCRIPTION OF THE PREFERRED EMBODIMENTS

The invention relates to a process for cooling and purifying a hot gas from a gasification reactor flowing substantially vertically upwards and containing sticky slag droplets and/or particles, which process comprises the following steps:

(a) a cold, clean synthesis gas is injected into the hot gas to obtain a gas mixture having a reduced temperature, (b) the velocity of the gas mixture is reduced, (c) the flow of the gas mixture is reversed so that the gas mixture flows downwards in a direction that is at an acute angle to the original substantially vertical direction of flow, (d) the velocity of the gas mixture flowing obliquely downwards is increased, (e) the gas mixture flowing obliquely downwards at increased velocity is cooled by indirect exchange of heat, (f) the velocity of the cooled gas mixture is reduced, (g) the flow of the gas mixture having a reduced velocity is reversed, so that the gas mixture now flows upwards in substantially vertical direction and slag particles drop down, (h) the gas mixture flowing substantially vertically upwards at reduced velocity is further cooled by indirect exchange of heat, while further quantity of slag particles drops down, (i) the slag particles are discharged.

The invention also relates to an apparatus for carrying out the process described hereinbefore, which apparatus is characterized in that it comprises the following components:

(a) a substantially vertical supply pipe for the gas, in which the gas can flow upwards, in the wall of which pipe openings have been provided for injecting cold, clean synthesis gas, (b) a flow-reversal vessel into which the top end of the supply pipe issues, the internal diameter of the vessel being larger than the internal diameter of the supply pipe, in which vessel the distance from the mount of the supply pipe to the internal upper boundary of the vessel is larger than the internal diameter of the supply pipe, while the bottom of the flow-reversal vessel slants downwards at an angle that is acute in relation to the supply pipe which is substantially vertically arranged, (c) a connecting pipe the top end of which is connected to the bottom of the flow-reversal vessel and the center line of which is at an acute angle to the vertical, (d) a substantially vertically arranged heat exchanger, which comprises a flow-reversal chamber at the bottom end, the side wall of which chamber is connected to the connecting pipe and the internal diameter of which is larger than the internal diameter of the connecting pipe, (e) a discharge pipe for slag particles which is connected to the bottom of the flow-reversal chamber of the heat exchanger.

Hot gas containing sticky liquid and/or solid slag in finally divided form is obtained when carbon-containing material, such as coal, brown coal, lignite, peat, petroleum coke, heavy residual petroleum fractions and oil recovered from tar sand or bituminous shale, is completely or partly combusted. The gas is generated in an oven or reactor and on leaving the oven or reactor it generally has a temperature in the range of from 1300° to 2000° C. A suitable reactor for this purpose is described in the British Pat. No. 1,150,284.

The hot gas leaves the reactor at the top end and then flows upwards through the substantially vertical supply pipe, preferably at an average linear velocity ranging from 5 to 20 m/s. A gas recovered by partial oxidation consists for the greater part of $H_2$ and $CO$, and possibly further of $CO_2$, $CH_4$, $H_2O$, $N_2$, $H_2S$ and $Ar$, and entrains sticky slag droplets and/or particles (dependant on the gas temperature and the nature of the inorganic components of the carbon-containing material to be combusted) from the reactor. The content of said sticky slag droplets and/or particles of the gas usually ranges from 1 to 15% by weight. In order to cool the hot gas rapidly to such a temperature that the sticky material occurring therein loses its stickiness, a quantity of 0.5-2 kg of a cold, clean gas is advantageously injected into the hot gas.

The cold, clean synthesis gas preferably has a temperature ranging from 50° to 300° C. and suitably has the same composition as the hot gas to be cooled down rapidly, so that the gas mixture obtained by injecting cold, clean gas into the hot gas preferably has a composition that does not deviate substantially from the original hot gas, the temperature of said gas mixture advantageously ranging from 700° to 1000° C.

The risk of slag particles occurring in the gas mixture clogging the further part of the cooling and purifying apparatus owing to settlement on their route there-through is substantially decreased by the hereinbefore described injection. Said injection may take place as described in U.S. Pat. No. 4,054,424, although various other embodiments are possible.

The cold, clean synthesis gas is in any case injected through openings in the wall of the substantially vertical supply pipe which is connected to the outlet of the reactor. For further cooling of the gas mixture obtained as a result of the injection of cold, clean gas into the hot, impure gas, the supply pipe suitably contains means by which the gas mixture can be indirectly cooled. Said means preferably consist of a membrane wall which is located on the inside of the supply pipe and through which coolant, for example water and/or steam, can flow.

In conventional coal gasification plants it has been usual to place a heat exchanger for cooling the generated gas above the gasification reactor. For relatively low capacities said arrangement is not unpractical, but for an apparatus in which a high rate of production of $H_2$- and CO-containing gas must be possible, it causes problems owing to the great structural height involved. In an apparatus of said type the reactor and the heat exchanger will, therefore, preferably be located next to each other. This means that the flow of the gas mixture must be reversed, but before doing so the velocity of the gas mixture is reduced, advantageously to a value in the range of from 0.5 to 3 m/s. Owing to the reduction of the velocity of the gas mixture flowing upwards, some of the slag particles entrained in the gas mixture will settle to the bottom of the space in which the velocity is reduced. In this phase the settled particles are not yet separated from the gas mixture, but are further entrained by the gas mixture.

In order to prevent settlement of slag the flow of gas mixture is preferably reversed in a flow-reversal vessel into which the top of the supply pipe issues. The internal diameter of said vessel is advantageously 2-4 times as large as the internal diameter of the supply pipe, while the distance from the mouth of the supply pipe to the internal upper boundary of the flow-reversal vessel is advantageously 2-10 times as large and very suitably 4-8 times as large as the internal diameter of the supply pipe, so that on entry of the gas mixture into the flow-reversal vessel the velocity of the gas mixture is correspondingly reduced. Consequently, the slag particles will settle to the bottom of the flow-reversal vessel which slants downwards at an angle that is acute in relation to the vertical.

This angle is preferably 20°–45°, so that settled slag particles will slide and/or roll down over the oblique bottom of the flow-reversal vessel and enter the connecting pipe, the top end of which is connected to the lower end of the bottom of the flow-reversal vessel. In order to prevent the settled slag particles from re-entering the supply pipe as they pass over the bottom of the flow-reversal vessel, the distance between the top end of the mouth of the supply pipe and the place where said mouth is connected to the bottom of the flow-reversal vessel is preferably 0.5-5 times as large as the internal diameter of the supply pipe, which distance is even more preferably in the range of 1-3 times the internal diameter of the supply pipe.

The flow of the gas mixture, from which at least some of the entrained slag particles have settled, is reversed in the flow-reversal vessel, preferably in a direction that is at an angle ranging from 135 to 160° to the original vertical direction of flow. It is subsequently discharged from the flow-reversal vessel to the connecting pipe the center line of which is at an angle preferably ranging from 20° to 45° to the vertical. If this angle is chosen larger than 45°, it is possible that the settled slag particles will no longer slide and/or roll down by gravity through the connecting pipe, owing to which additional measures are necessary to prevent clogging of the connecting pipe. If said angle is chosen smaller than 20°, the various parts of the present apparatus (i.e. reactor with supply pipe and flow-reversal vessel, connecting pipe, heat exchanger) will be too compactly arranged so that practical design and operation become impossible.

In the connecting pipe the velocity of the gas mixture flowing obliquely downwards is again increased, preferably to a value ranging from 5 to 20 m/s. This velocity of the gas mixture helps to transport the slag particles, settled in the flow-reversal vessel, quickly through the connecting pipe. In order to maintain the above-mentioned preferred velocity of the gas mixture, the diameter of the connecting pipe is suitably chosen approximately equal to that of the supply pipe. On its route through the flow-reversal vessel and the connecting pipe the gas mixture is advantageously further cooled, preferably by indirect heat exchange and to a temperature ranging from 500° to 900° C. In order to ensure this, the flow-reversal vessel and the connecting pipe are suitably provided with means by which the gas mixture can be cooled indirectly. To this end membrane walls, through which coolant, for example water and/or steam, can flow are most suitable and are therefore preferred.

The bottom end of the connecting pipe is connected to the flow-reversal chamber of a practically vertically arranged heat exchanger. Said flow-reversal chamber is of course located at the bottom end of the heat exchanger. In order to prevent settlement of slag, the velocity of the gas mixture flowing from the connecting pipe into said reversal chamber is first reduced therein, preferably to a value ranging from 0.5 to 3 m/s. In order to ensure this, the internal diameter of the reversal chamber of the heat exchanger is preferably 2 to 4 times as large as the internal diameter of the connecting pipe.

In the reversal chamber of the heat exchanger some of the slag particles still present in the gas mixture will settle. The connecting pipe is preferably connected to the side-wall of the flow-reversal chamber of the heat exchanger at a point located at a distance from the bottom of the reversal chamber that is equal to 2 to 10, preferably 4 to 8 times the internal diameter of the connecting pipe.

The vertically arranged heat exchanger is preferably of a type in which the gas to be cooled is conducted around cooling pipes through which coolant suitably consisting of water and/or steam flows. The internal diameter of the reversal chamber of the heat exchanger is preferably 2 to 4 times as large as the internal diameter of the connecting pipe.

Consequently, the gas mixture flowing upwards in said chamber is delayed with respect to the gas mixture flowing downwards in the connecting pipe. Owing to this delayed upward movement of the gas mixture the slag particles still present therein will tend no longer to be entrained upwards but just to drop down. In this manner the solid matter content of the gas mixture is reduced in the reversal chamber, advantageously in such a manner that at the transition of the reversal chamber to the remaining part of the indirect heat exchanger the gas mixture flowing substantially vertically upwards has a slag particle content ranging from 0.5 to 7.5% by weight.

Said gas mixture is cooled on its route through the heat exchanger, for example to a temperature ranging from 150° to 400° C., while the slag content is reduced to a value ranging from 0.3 to 5% by weight, since a further quantity of slag particles also settles in the heat exchanger.

The slag particles dropping down in the flow-reversal chamber and in the remaining part of the heat exchanger settle on the bottom of the reversal chamber. They must continuously or periodically be removed from the bottom. To this end a discharge pipe for slag particles is connected to the bottom of the reversal chamber, which discharge pipe preferably issues into an apparatus for removing slag particles.

Said apparatus may consist of an ordinary vessel if the gasification of the carbon-containing material and the subsequent cooling and purification of the gas thus generated take place at substantially atmospheric pressure. However, gasification, cooling and purification preferably take place at elevated pressure, for example 10 to 60 bar. Therefore, the apparatus for removing slag particles will generally consist of a lock system. Per ton of hot gas that is introduced into the cooling and purifying apparatus a quantity of 2 to 50 kg of slag particles is advantageously discharged from the flow-reversal chamber.

Despite all measures described hereinbefore, it is still possible that a few particles will adhere to the inner walls of the supply pipe, reversal vessel, connecting pipe and heat exchanger, as a result of which the cooling effect of said surfaces is reduced and the passage through the whole system is reduced. These effects are undesirable. Therefore, means are preferably connected to the supply pipe, reversal vessel, connecting pipe and/or heat exchanger to remove slag deposits from the inner walls of said components. Said means may be of various types, for example acoustic, mechanical and/or electrical means. However, mechanical jogging means are preferably connected for said purpose. For optimum operation of the latter means the supply pipe, reversal vessel, connecting pipe and/or the reversal chamber of the heat exchanger are preferably designed in such a manner that there is some clearance between the above-mentioned membrane wall, on the inside of which slag particles can settle, and an insulating layer suitably arranged against the inside of the (steel) outer wall of said components of the apparatus according to the invention, which outer wall is preferably kept relatively cool, since it must be capable of absorbing forces resulting from the high pressure, for example 10–60 bar, at which the process according to the invention is preferably carried out.

The invention will now be further illustrated with reference to the FIGURE showing a diagrammatic representation of the apparatus in which the process according to the invention is carried out, in which drawing auxiliary equipment, such as pumps, compressors, valves, cleaning devices and control instruments are not shown.

However, the invention is by no means limited to the description based on this FIGURE. Through lines 1, 2 and 3 coal powder in a carrier gas, such as $N_2$, oxygen and possibly steam are respectively introduced into a reactor 4 in which they are interreacted to form a hot gas mainly consisting of $H_2$ and CO, but also containing entrained slag droplets. This process also involves the formation of liquid slag which is mainly discharged through a line 5. The hot gas is removed from the reactor 4 through a supply pipe 6, while cold, clean gas, preferably of about the same gas composition as the hot gas, is injected through a line 7.

Consequently, a gas mixture of reduced temperature is formed in which the entrained original slag droplets have coagulated to form slag particles the upward velocity of which is reduced in a flow-reversal vessel 8 to a value that preferably approximates one-third of that of the gas mixture in supply pipe 6. In the reversal vessel 8 the direction of the gas mixture is also reversed, so that the gas mixture can leave the reversal vessel through a connecting pipe 9. During the reduction of the velocity of the gas mixture in the flow-reversal vessel some of the slag particles drop down to the oblique bottom of the vessel 8 and roll and slide along said bottom into the connecting pipe 9. Through the connecting pipe 9 the gas mixture, which is further indirectly cooled in this pipe and the velocity of which is again increased to a value approximating that in the supply pipe, enters together with the separated slag particles, a flow-reversal chamber 10 of a heat exchanger 11. In said reversal chamber 10 the velocity of the gas mixture is again reduced to a value approximating that in the reversal vessel 8, so that a further quantity of slag particles is separated from this gas mixture. Together with the slag particles already separated off in the reversal vessel 8 and with the slag particles that will subsequently settle from the gas in the heat exchanger 11 they drop on the bottom of the reversal chamber 10. Through a line 12 they are discharged to a vessel 13 from which they are periodically or continuously removed through a line 14.

In the heat exchanger 11 the rising gas mixture is further cooled by means of cooling water that is introduced along a line 15, is then passed through the heat exchanger in a set of cooling pipes 16 and finally discharged through a line 17, optionally in the form of (superheated) steam. The cooled and purified gas leaves the apparatus through a line 18.

EXAMPLE

In a process diagrammatically shown in the FIGURE, 86 tons/h of gas is generated in the coal gasification reactor 4. It has a temperature of 1600° C. and a composition as shown in the following table.

|  | Vol. % |
|---|---|
| $H_2S$ | 27.1 |
| CO | 60.8 |
| $CO_2$ | 2.0 |
| $CH_4$ | 0.01 |
| $N_2$ | 5.4 |
| Ar | 1.0 |
| $H_2O$ | 2.6 |
| $H_2S$ | 0.9 |

It contains 5.1% by weight of slag in the form of droplets. Into said gas 73 tons/h of cold, clean gas is injected through the line 7, which gas has the following composition.

|  | Vol. % |
|---|---|
| $H_2$ | 27.6 |
| CO | 61.1 |
| $CO_2$ | 2.0 |
| $CH_4$ | 0.01 |
| $N_2$ | 5.6 |

-continued

|  | Vol. % |
|---|---|
| Ar | 1.0 |
| $H_2O$ | 0.6 |
| $H_2S$ | 0.9 |

As a result of this injection a quantity of 159 tons/h of a gas mixture having a temperature of 900° C. and a slag content of 2.8% by weight is formed.

The gas composition is as follows:

|  | Vol. % |
|---|---|
| $H_2$ | 27.3 |
| CO | 61.4 |
| $CO_2$ | 2.0 |
| $CH_4$ | 0.01 |
| $N_2$ | 5.5 |
| Ar | 1.0 |
| $H_2O$ | 1.7 |
| $H_2S$ | 0.9 |

On its route through the supply pipe 6 said gas mixture is further cooled to 800° C. after which it enters the flow-reversal vessel 8, in which its velocity is reduced from 10 m/s to 3 m/s. It leaves the reversal vessel 8 through the connecting line 9 at a velocity of 8 m/s, while 10% by weight of the slag particles present therein, which are separated off in the reversal vessel 8, slide obliquely downwards along the wall of the connecting pipe 9.

On its route through the connecting pipe 9, in which the gas mixture has a velocity of 8 m/s, it is further cooled to 690° C. at which temperature it enters the reversal chamber 10.

In the latter reversal chamber it is delayed to a velocity of 3 m/s and reversed so that it flows substantially normally upwards in the heat exchanger 11 while it is cooled. Through a line 18 it is discharged from the system at a temperature of 360° C. and with a solid matter content of 2.2% by weight. A quantity of 950 kg/h of finely divided solid slag is discharged to the vessel 13 through the line 12.

What is claimed is:

1. A process for cooling and cleaning hot crude synthesis gas containing sticky slag droplets and/or particles leaving a solid hydrocarbon gasification reactor comprising
   (a) quenching the hot crude synthesis gas leaving the reactor in an upflow direction by injection therein of a cold purified synthesis gas and coagulating the slag droplets therein to form slag particles;
   (b) reducing the velocity of the synthesis gas stream, and reversing the flow of the stream in a downward direction;
   (c) increasing the velocity of the gas stream;
   (d) again reversing the flow of the stream in an upflow direction, and decreasing the velocity of the gas stream;
   (e) indirectly cooling the gas stream; and
   (f) separating slag particles from the gas stream.

2. The process of claim 1 wherein the reversal of flow in step (b) is carried out in a vessel having an oblique bottom, and at least some of the entrained particles settle from the gas stream.

3. A process for cooling and purifying a hot synthesis gas flowing substantially vertically upwards from a hydrocarbon gasification reactor and containing sticky slag droplets and/or particles comprising
   (a) injecting a cold, clean synthesis gas into the hot synthesis gas to obtain a gas mixture having a reduced temperature and coagulating the slag droplets to form slag particles;
   (b) reducing the velocity of the gas mixture;
   (c) reversing the flow of the gas mixture so that the gas mixture flows downward in a direction that is at an acute angle to the original substantially vertical upwards direction of flow;
   (d) increasing the velocity of the gas mixture flowing obliquely downwards;
   (e) cooling the gas mixture flowing obliquely downwards at an increased velocity by indirect exchange of heat;
   (f) reducing the velocity of the cooled gas mixture;
   (g) reversing the stream of the gas mixture having a reduced velocity so that the gas mixture flows upwards in substantially vertical direction and slag particles fall down;
   (h) further cooling the gas mixture flowing substantially vertically upwards at reduced velocity by indirect exchange of heat, while a further quantity of slag particles falls down; and
   (i) discharging the slag particles.

4. The process of claim 3 wherein the hot gas has a temperature ranging from about 1,300° to 2,000° C.

5. The process of claim 3, wherein the hot gas flows substantially vertically upwards at an average linear velocity ranging from 5 to 20 meters/second.

6. The process of claim 3 wherein the hot gas has a sticky slag droplet and/or particle content range from about 1 to 15% by weight.

7. The process of claim 3 wherein from 0.5 to 2 kg of cold, clean gas is injected per kg of hot gas.

8. The process of claim 3 wherein the cold, clean gas has a temperature from about 50° to 300° C.

9. The process of claim 3 wherein the average temperature of the gas mixture obtained by the injection of cold, clean gas into the hot synthesis gas is from 700° to 1000° C.

10. The process of claim 3 wherein in step (b) the average linear velocity is reduced to a value ranging from 0.5 to 3 meters/second.

11. The process of claim 3 wherein in step (c) the stream of the gas mixture is reversed in a direction that is at an angle from about 20° to 45° to the original vertical direction of flow.

12. The process of claim 3 wherein in step (d) the velocity of the gas mixture flowing obliquely downwards is increased to a value from about 5 to 20 meters/second.

13. The process of claim 3 wherein in step (e) the gas mixture flowing obliquely downwards is cooled by indirect heat exchange to a temperature from about 500° to 900° C.

14. The process of claim 3 wherein in step (f) the velocity of the cooled gas mixture is reduced to a value from about 0.5 to 3 meters/second.

15. The process of claim 3 wherein in step (g) the gas mixture flowing substantially vertically upwards has a slag particle content from about 0.5 to 7.5% by weight.

16. The process of claim 3 wherein in step (h) the gas mixture flowing substantially vertically upwards is cooled by indirect heat exchange to a temperature from 150° to 400° C. and the slag content being reduced to from 0.3 to 5% by weight.

17. The process of claim 3 wherein in step (i) per ton of hot gas a quantity of solid slag particles ranging from 2 to 50 kg is discharged.

* * * * *